(12) United States Patent
Sheng

(10) Patent No.: US 9,177,420 B2
(45) Date of Patent: Nov. 3, 2015

(54) INTUITIVE SHAPE CONTROL FOR BOUNDARY PATCHES

(75) Inventor: Xuejun Sheng, Ann Arbor, MI (US)

(73) Assignee: AUTODESK, INC., San Rafael, CA (US)

( * ) Notice: Subject to any disclaimer, the term of this patent is extended or adjusted under 35 U.S.C. 154(b) by 886 days.

(21) Appl. No.: 12/911,676

(22) Filed: Oct. 25, 2010

(65) Prior Publication Data

US 2012/0098821 A1    Apr. 26, 2012

(51) Int. Cl.
*G06T 17/10* (2006.01)
*G06T 19/20* (2011.01)

(52) U.S. Cl.
CPC ............. *G06T 17/10* (2013.01); *G06T 19/20* (2013.01); *G06T 2219/2021* (2013.01)

(58) Field of Classification Search
CPC .. G06T 17/10; G06T 19/20; G06T 2219/2021
USPC .................................. 345/419, 420; 715/964
See application file for complete search history.

(56) References Cited

U.S. PATENT DOCUMENTS

| | | | |
|---|---|---|---|
| 5,488,684 A * | 1/1996 | Gharachorloo et al. ...... | 345/423 |
| 5,490,241 A * | 2/1996 | Mallgren et al. .............. | 345/440 |
| 5,619,625 A * | 4/1997 | Konno et al. ................. | 345/419 |
| 5,636,338 A * | 6/1997 | Moreton ........................ | 345/442 |
| 5,729,750 A * | 3/1998 | Ishida ........................... | 715/209 |
| 5,796,400 A * | 8/1998 | Atkinson et al. .............. | 345/420 |
| 5,903,458 A * | 5/1999 | Stewart et al. .................. | 700/98 |
| 6,198,979 B1 * | 3/2001 | Konno ........................... | 700/98 |
| 6,204,860 B1 * | 3/2001 | Singh ............................. | 345/420 |
| 6,256,030 B1 * | 7/2001 | Berry et al. .................... | 715/854 |
| 6,639,592 B1 * | 10/2003 | Dayanand et al. ............. | 345/419 |
| 6,906,718 B1 * | 6/2005 | Papakipos et al. ............. | 345/441 |
| 7,196,702 B1 * | 3/2007 | Lee et al. ....................... | 345/419 |
| 7,200,532 B1 | 4/2007 | Cheng | |
| 7,212,205 B2 * | 5/2007 | Uesaki et ...................... | 345/423 |
| 7,236,167 B2 | 6/2007 | Lee et al. | |
| 7,295,204 B2 * | 11/2007 | Sfarti ............................. | 345/423 |
| 7,417,635 B2 * | 8/2008 | Rockwood et al. ........... | 345/419 |
| 7,496,416 B2 * | 2/2009 | Ferguson et al. ................ | 700/83 |
| 7,561,990 B2 | 7/2009 | Lewis et al. | |
| 7,626,589 B2 * | 12/2009 | Berger .......................... | 345/582 |
| 7,636,091 B2 * | 12/2009 | Rockwood et al. ........... | 345/420 |

(Continued)

OTHER PUBLICATIONS

Kuhn, Alexander, "Surface Extraction from Curve Networks", (Jun. 2009).*

(Continued)

*Primary Examiner* — Kee M Tung
*Assistant Examiner* — Roberta D Prendergast
(74) *Attorney, Agent, or Firm* — Artegis Law Group, LLP

(57) ABSTRACT

A method and system for computer aided design (CAD) is disclosed for intuitive shape control of boundary patch. A boundary patch is also known as n-sided patch which is defined by a number of input curves/edges. Continuity constraints ($G^0$, $G^1$ and $G^2$) can be specified individually for the input curves. Boundary patch is primarily used to cover a relatively flat area where other modeling operators such as loft, sweep or fillet cannot apply due to irregular shape of the area. The present invention provides a technique to directly manipulate boundary tangent magnitude of a patch and allows the user to deform the patch shape in a very intuitive way. Thus, the present invention is especially useful for industrial design applications.

21 Claims, 7 Drawing Sheets

(56) References Cited

U.S. PATENT DOCUMENTS

| | | | |
|---|---|---|---|
| 7,782,322 B2* | 8/2010 | Setoguchi | 345/442 |
| 7,952,575 B2* | 5/2011 | Rosel | 345/420 |
| 8,259,101 B2* | 9/2012 | Shimada et al. | 345/419 |
| 8,284,193 B2* | 10/2012 | Hanisch et al. | 345/420 |
| 8,355,020 B1* | 1/2013 | Hanau et al. | 345/419 |
| 8,543,902 B2* | 9/2013 | Algreatly | 715/211 |
| 2004/0085311 A1* | 5/2004 | Lee et al. | 345/419 |
| 2004/0113910 A1* | 6/2004 | Tsai et al. | 345/420 |
| 2007/0018987 A1* | 1/2007 | Setoguchi | 345/441 |
| 2007/0216713 A1* | 9/2007 | Kripac | 345/678 |
| 2007/0229543 A1* | 10/2007 | Liepa et al. | 345/647 |
| 2008/0024499 A1* | 1/2008 | Bateman | 345/441 |
| 2009/0231338 A1* | 9/2009 | Carr et al. | 345/423 |
| 2009/0284550 A1* | 11/2009 | Shimada et al. | 345/619 |

OTHER PUBLICATIONS

George Celniker and Will Welch. 1992. Linear constraints for deformable non-uniform B-spline surfaces. In Proceedings of the 1992 symposium on Interactive 3D graphics (I3D '92). ACM, New York, NY, USA, 165-170.*

"How Does CAD Works?", written by Suvo, edited by Lamar Stonecypher, updated Mar. 25, 2010, and retrieved from: http://www.brighthubengineering.com/cad-autocad-reviews-tips/67118-how-does-cad-work/.*

K. Preston White, Jr., Larry G. Richards, "Computer-aided design and manufacturing," in AccessScience, © McGraw-Hill Education, 2012, http://www.accessscience.com.*

Alan H. Barr, 1984, "Global and local deformations of solid primitives", SIGGRAPH Computer Graphics, vol. 18, No. 3, Jul. 1984, pp. 21-30.*

J. A. Brewer and D. C. Anderson, 1977, "Visual interaction with overhauser curves and surfaces", SIGGRAPH Computer Graphics, vol. 11, No. 2, (Jul. 1977), pp. 132-137.*

Paul Borrel and an Rappoport, 1994, "Simple constrained deformations for geometric modeling and interactive design", ACM Transactions on Graphics, vol. 13, Issue 2 (Apr. 1994), pp. 137-155.*

Zhou, L.; Kambhamettu, C., "Extending superquadrics with exponent functions: modeling and reconstruction," 1999 IEEE Computer Society Conference on Computer Vision and Pattern Recognition, vol. 2, Jun. 1999, pp. 73-78.*

Hu, S-M., Y-F. Li, Tao Ju, and Xiang Zhu. "Modifying the shape of NURBS surfaces with geometric constraints." Computer-Aided Design 33, No. 12 (2001): 903-912.*

Anonymous, "Non-Uniform Rational B-spline", Wikipedia definition for Geometric Continuity with respect to NURBs surfaces, retrieved from: http://en.wikipedia.org/wiki/Non-uniform_rational_B-spline.*

Anonymous, "Smoothness", Wikipedia definition for both Parameteric and Geometric Continuity, retrieved from: http://en.wikipedia.org/wiki/Smoothness.*

Theisel, Holger. "Geometric conditions for G 3 continuity of surfaces." Computer aided geometric design 14, No. 8 (1997): 719-729.*

* cited by examiner

INTUITIVE SHAPE CONTROL FOR BOUNDARY PATCHES

BACKGROUND OF THE INVENTION

1. Field of the Invention

The present invention relates generally to computer aided design (CAD) applications and, in particular, to intuitively controlling the shape of a boundary patch.

2. Description of the Related Art

Computer aided design systems are traditionally used for creating and editing geometric shapes, such as car body parts or engine components. Various modeling operators have been introduced for specific modeling situations. Most noticeable standard ones include loft, sweep and fillet which are well defined over a rectangular domain.

In practical design applications there are often situations to fill arbitrary regions bounded by multiple sides (typically, greater than four) where standard operators are no longer applicable. This calls for a special operator, the n-sided patch or the boundary patch. A boundary patch is defined by a set of input curves over a relatively flat area. Continuity constraints ($G^0$, $G^1$ and $G^2$) can be specified individually for these curves. The patch to be constructed should pass through all given curves and satisfy the continuity constraints within given tolerances.

It is, however, very challenging to construct a boundary patch that not only meets the boundary constraints but also possesses a fair shape under various geometric configurations. As a result, boundary patch has been a long standing problem in both design and research community and there are a large body of proposed solutions to it.

In general, there are two basic approaches to the n-sided problem: multiple patches and single patch. The multiple patches solution takes an n-sided region and subdivides it into a collection of triangular or 4-sided regions. The regions are then filled with standard surface type. The main difficulty with this approach is ensuring the internal smoothness of the resulting patch network. The single patch solution attempts to create a single patch to fill in an n-sided hole. Different techniques have been developed for very specific patch situations. For example, in one technique, a quadratic function is used to fill in three- or five-sided patches. In another technique, quadratics and cubics functions are used for three-, five- and six-sided patches. The problem with these techniques is that often unusual (non-rectangular, non-planar) parametric domains are used and the lack of possibility to control internal shape of the patch.

Another category of filling an n-sided hole is the subdivision approach. The basic process is to generate a surface by starting with a polygonal approximation and refine the approximation iteratively in each subdivision step. The fundamental problem with the subdivision approach, however, is the lack of a good method to handle the smoothness of extraordinary points and to create high quality surfaces.

Commercial CAD systems prefer the single patch approach since only one face needs to be constructed and thus is easier to be integrated in the modeling (especially solid modeling) environment. As the rectangular scheme of non-uniform ration B-spline (NURBS) has become the de facto standard for industrial applications, NURBS is often chosen to represent n-sided patches. First, a surface with a rectangular domain is created that is large enough to cover the entire n-sided hole. The surface is then trimmed back to the hole boundary. In this sense, the patch is a trimmed NURBS surface. This kind of n-sided patch is, however, locked by the boundary constraints, i.e. there are little possibilities to determine/change its interior shape. One can insert additional interior constraints such as interior curves and points to force the patch to pass through. However, these additional constraints introduce some artifacts in the patch shape so that the patch quality (e.g. curvature flow) may suffer. Certain tension control may be achieved but its influence over the entire patch shape is somewhat subtle and limited.

As the foregoing illustrates, what is needed in the art is a mechanism for modifying the patch shape in a direct and intuitive way.

SUMMARY OF THE INVENTION

One or more embodiments of the invention is a computer-implemented method for modifying the shape of a graphics object represented in a computer-aided design (CAD) application. The method includes the steps of generating a surface based on one or more boundaries of the graphics object, wherein the surface has a shape defined by a set of first coordinates, mapping the set of first coordinates to a set of second coordinates that identifies a different tangent for each of the one or more boundary edges, modifying a first tangent for a first boundary edge, and modifying the set of second coordinates based on the modified first tangent to generate a modified shape of the surface.

Advantageously, the technique described herein allows for the modification of a boundary patch by modifying tangent magnitudes along the boundaries.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Hardware Environment

Figure 1:
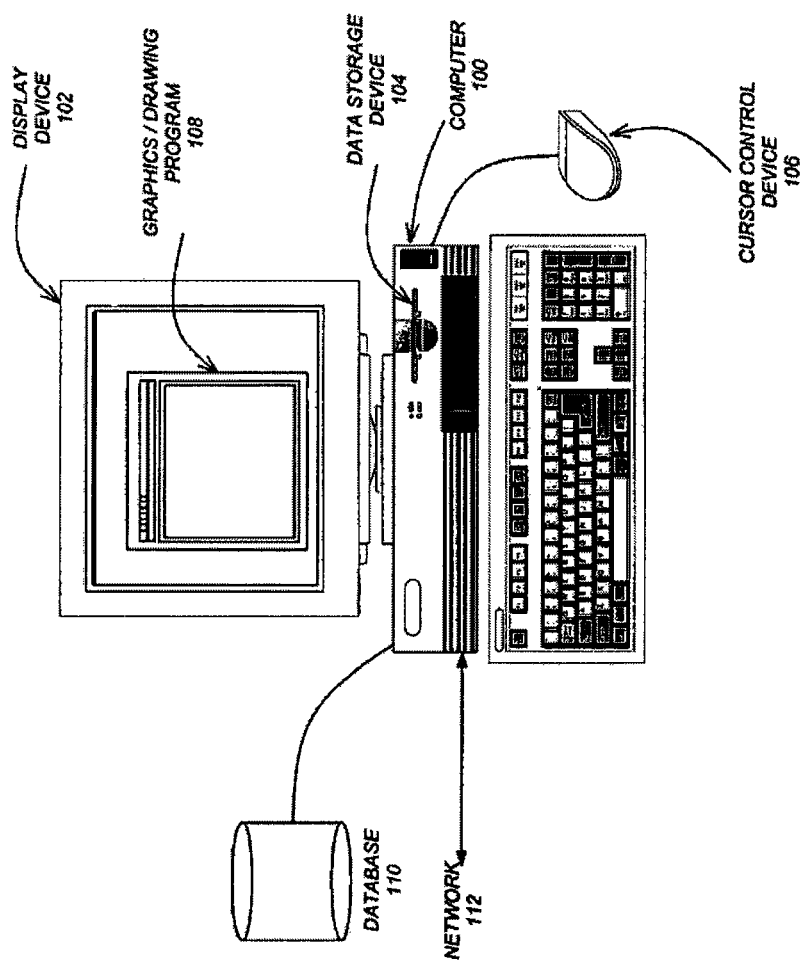
FIG. 1 is a computing environment configured implement one or more embodiments of the invention.

FIG. 1 is a computing environment configured to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented graphics program 108 (e.g., a CAD program), wherein the graphics program 108 is represented by a window displayed on the display device 102. Generally, the graphics program 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc. Further, the graphics/drawing program 108 may utilize a database 110 such as a spatial database.

Computer 100 may also be connected to other computers 100 (e.g., a client or server computer) via network 112 comprising the Internet, LANs (local area network), WANs (wide area network), or the like. Further, database 110 may be integrated within computer 100 or may be located across network 112 on another computer 100 or accessible device.

Those skilled in the art will recognize that the exemplary environment illustrated in FIG. 1 is not intended to limit the present invention. Indeed, those skilled in the art will recognize that other alternative environments may be used without departing from the scope of the present invention. Accordingly, FIG. 1 illustrates a CAD system that combines the traditional capabilities of CAD tools with common spatial management features. In this regard, such a solution enables the use of true geometry, precision, powerful creation and editing tools, and drawing and document production of a CAD system. Further, single or multiple users may integrate their workflow using such a system.

As described above, one or more embodiments of the invention is implemented in a CAD system. The invention provides a technique for intuitively modifying the shape of a boundary patch defined by a set of input curves/edges.

Surface Representation

Figure 2:
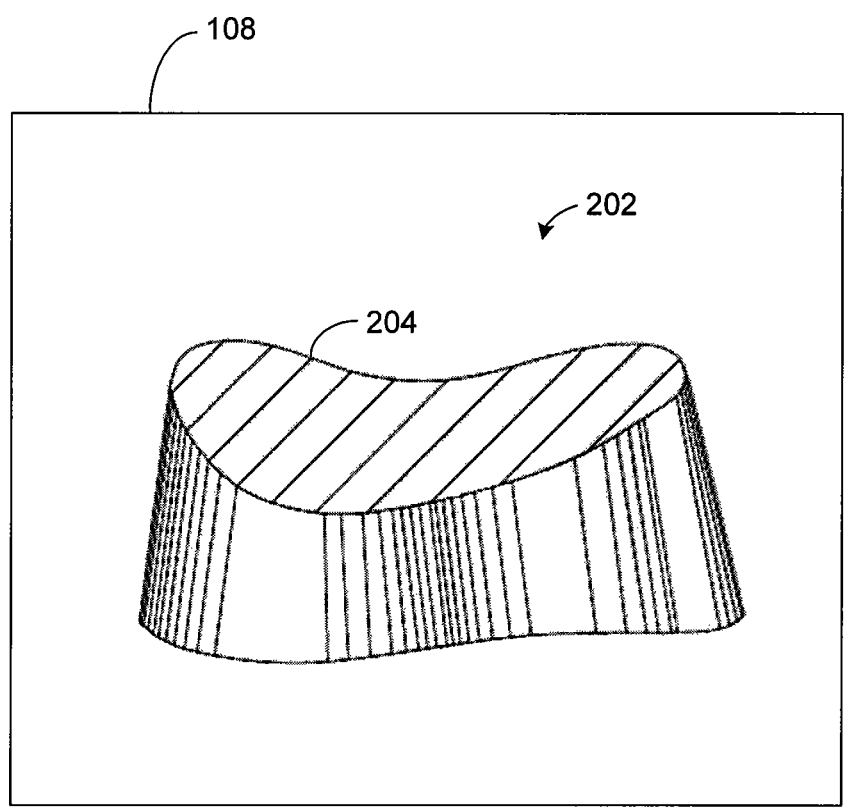
FIG. 2 illustrates a graphics object generated using the drawing program of FIG. 1, according to one embodiment of the invention.

FIG. 2 illustrates a graphics object 202 generated using the drawing program 108 of FIG. 1, according to one embodiment of the invention. To construct a surface that passes through all input curves 204 of the graphics object 202 identified by a user of the graphics program 108, a parametrization is first defined for the surface. An obvious choice is to first create a so called best-fit plane that best fits the input curves in the least squares sense. The necessary parametrization is then obtained by projecting the curves onto the plane. Without loss of generality, such a best-fit plane can be assumed to be the X-Y plane. Importantly, any plane can be converted to the X-Y plane by affine transformations. Thus, the boundary patch can be expressed in the explicit form z=S(x, y). To achieve a fair shape the boundary patch is further designed to minimize the following smoothness function:

$$\int\int\left[\left(\frac{\partial^2 S}{\partial x^2}\right)^2 + 2\left(\frac{\partial^2 S}{\partial x \partial y}\right)^2 + \left(\frac{\partial^2 S}{\partial y^2}\right)^2\right]dx\,dy \tag{1}$$

A surface created with the above smoothness tends to distribute curvature over large regions and produces very graceful shapes. If B-spline is used to represent the boundary patch, solving the smoothness functional becomes the discrete matrix minimization problem:

$$\min[(x^T)Kx] \tag{2}$$

$x^T=\{P_{i,j}\}$ is a vector of (m×n) control points and K defines the stiffness matrix and is given by:

$$\int\int \Phi^T M\Phi\,dx\,dy \tag{3}$$

$$\Phi = \begin{bmatrix} \Psi_{xx} \\ \Psi_{xy} \\ \Psi_{yy} \end{bmatrix},$$

$$M = \begin{bmatrix} 1 & & \\ & 2 & \\ & & 1 \end{bmatrix}$$

where
and $\psi=\{N_i(x)N_j(y)\}$ with i=0, ..., n, j=0, ..., m and $N_i$ is the B-spline basis function.

Boundary Constraints

Boundary constraints include $G^0$, $G^1$ and $G^2$ constraints and can be written as linear equations:

$$Ax=b \tag{4}$$

where each row of the matrix A represents a linear constraint on x and the vector b are the values of these constraints. The final equations for determining X are determined by minimizing the quadratic functional (2) subject to the constrained equation (4).

Boundary constraints include $G^0$, $G^1$ and $G^2$ constraints and can be written as linear equations. $G^0$ constraint is a position constraint that requires the surface to interpolate a specified position. Thus, b just contains the position coordinates, namely the z coordinates. $G^1$ constraint requires the surface to assume a specified normal vector $\vec{N}$ =(N)(x),N(y),N(z)).

Let $\vec{S_x}$ =(1,0,$S_x$) and $\vec{S_y}$ =(0,1,$S_y$) be the surface partial derivatives, the sufficient $G^1$ conditions are then given by:

$$\begin{cases} <\vec{S_x},\vec{N}> = 0 \\ <\vec{S_y},\vec{N}> = 0 \end{cases} \tag{5}$$

which yields:

$$N(x)+S_x N(z)=0$$

$$N(y)+S_y N(z)=0 \tag{6}$$

Thus, we obtain the following $G^1$ constraint equation:

$$\begin{cases} S_x = -\dfrac{N(x)}{N(z)} \\ S_y = -\dfrac{N(y)}{N(z)} \end{cases} \quad (7)$$

From the above equation we can see that both $S_x$ and $S_y$ are fully determined by the surface normal. As a result, there is no degree of freedom to modify them in the presence of $G^1$ constraint.

Two surfaces are said $G^2$ at a touch point if their curvatures at that point agree in all directions. For regular surfaces $G^2$ condition holds if the curvatures of the two surfaces are the same in three independent directions. Therefore, the $G^2$ constrained equations can be derived in a manner similar to that of $G^1$.

Modified Spherical Coordinate System

Boundary tangents of a surface have great influence over its overall shape. If only position constraints are required, i.e. a boundary patch only needs to interpolate given boundaries, both directions and magnitudes of boundary tangents can be used to adjust the patch shape. However, if $G^1$ or $G^2$ constraints are present, boundary tangents are fully constrained. As shown in the previous section, there is no degree of freedom to modify either their directions or magnitudes in the Cartesian coordinate system. To overcome this limitation, a new coordinate system called the modified spherical coordinate system is defined as described below.

Let O be the origin of the coordinate system and the reference plane is the X-Z plane. Then a point P=(x,y,z) in the Cartesian coordinate system is defined by the coordinate triple (r,u,v) in the modified spherical coordinate system as:

$$\begin{cases} r = \sqrt{x^2 + y^2 + (z + f(x,y))^2} \\ u = \sin^{-1}(y/r) \\ v = \tan^{-1}(x/(z + f(x,y))) \end{cases} \quad (8)$$

Similarly, r is the radius or radial distance of point P to a point O' resulted from moving the origin O a distance of $f(x,y)$ along the positive Z-axis. u is the polar angle between the Y-axis and the line segment $\overline{O'P}$ and v the so-called the azimuthal angle measured from the positive Z-axis to the orthogonal projection of the line segment $\overline{O'P}$ on the reference plane. $f(x,y)$ is a function defined over the (x,y) domain and will be further described in the next section. Point O' can be viewed as the origin of the new coordinate system and the modified coordinate system as a spherical coordinate system with a variable origin.

From equation (8) it is trivial to derive the formulae of mapping from the modified spherical coordinate system to the Cartesian coordinate system as follows:

$$\begin{cases} x = r\cos u \sin v \\ y = r\sin u \\ z = r\cos u \cos v - f(x,y) \end{cases} \quad (9)$$

In the modified spherical coordinate system, the patch surface is now parametrically defined over the (u,v) domain and the smoothness functional (1) becomes:

$$\int\int \left[ \left(\frac{\partial^2 r}{\partial u^2}\right)^2 + 2\left(\frac{\partial^2 r}{\partial u \partial v}\right)^2 + \left(\frac{\partial^2 r}{\partial v^2}\right)^2 \right] du\, dv \quad (10)$$

The corresponding discrete matrix form is re-written in the same way as in (3).

The boundary constraints can be expressed in the modified spherical coordinate system. For $G^1$ constraints, first the $1^{st}$ partial derivatives of the surface in u and v are computed:

$$S_u: \begin{cases} x_u = (r_u\cos u - r\sin u)\sin v \\ y_u = r_u\sin u + r\cos u \\ z_u = (r_u\cos u - r\sin(u)\cos v) - f_u \end{cases}$$

$$S_v: \begin{cases} x_v = (r_v\sin v + r\cos(v)\cos u) \\ y_v = r_v\sin u \\ z_v = (r_v\cos v - r\sin v)\cos u - f_v \end{cases}$$

The $1^{st}$ partial derivatives of $f(x,y)$ are then derived through the chain rule as:

$$\begin{cases} f_u = f_x x_u + f_y y_u = r_u(f_x \cos u \sin v + f_y \sin u) + r(f_y \cos u - f_x \sin u \sin v) \\ f_v = f_x x_v + f_y y_v = r_v(f_x \cos u \sin v + f_y \sin u) + rf_x \cos u \cos v \end{cases}$$

Finally, the $G^1$ condition (3) is rewritten in the following equation $$\begin{cases} f\blacksquare(r_1 u = r(\sin u \sin v N(x) - \cos u N(y) + \\ (\sin u \sin v - f_1 x \sin u \sin v + f_1 y \cos u)N(z))/w \\ r_1 v = r(-\cos u \cos v N(x) + \cos u \sin v N(z) + f_1 x \cos u \cos v N(z))/w \end{cases}$$

where w=cos u sin v N(x)+sin u N(y)+(cos u cos v–$f_x$ cos u sin v–$f_y$ sin u)N(z).

From the above equation, the surface tangent is now determined by the constraint normal $\vec{N}$ as well as the unknown function $f(x,y)$. Since the constraint normal is given, $f(x,y)$ is used to modify surface tangents which will be further described in the next section.

Uniform Vs. Non-Uniform Scaling

To see how the function $f(x,y)$ affects the surface tangent vector, the following assumption is made $f(x,y)=C$, where C is a constant. Based on this assumption:

$$f_u = f_v = f_x = f_y = 0 \quad (15)$$

Both $r_u$ and $r_v$ are proportional to r. If equation (14) is inserted into the equations (11) and (12), it becomes clear that $\vec{S_u}$ and $\vec{S_v}$ are also proportional to r. r is computed by:

$$r = \sqrt{x^2 + y^2 + (z+C)^2} \quad (16)$$

Therefore, if C increases, then the value r goes up and effectively scales up the magnitudes of surface tangents $\vec{S_u}$ and $\vec{S_v}$. Similarly decreasing C will scale down the tangent magnitudes. Since the change of C equally affects surface tangents along the boundary, we call this kind of change the "uniform" scaling of surface tangent magnitudes, and C the scale factor. Obviously, the relative influence of C over r (consequently the surface tangents) is dependent on the dimension of r and therefore the size of the model.

Figure 3:
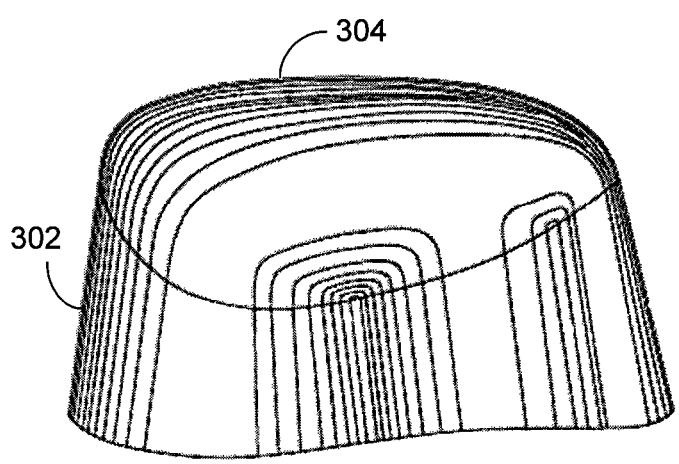
FIG. 3 illustrates the graphics object of FIG. 2 with a surface generated based on input boundaries and uniform scaling with a scale factor of 0.3, according to one embodiment of the invention.
Figure 4:
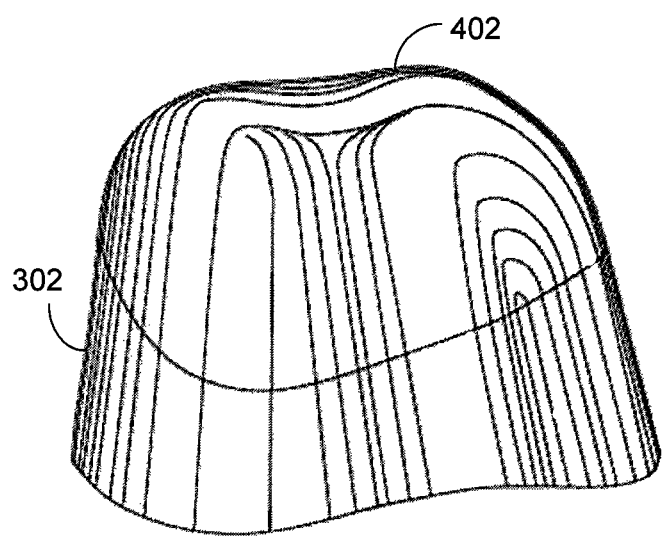
FIG. 4 illustrates the graphics object of FIG. 2 with a surface generated based on input boundaries and uniform scaling with a scale factor of 0.5, according to one embodiment of the invention.
Figure 5:
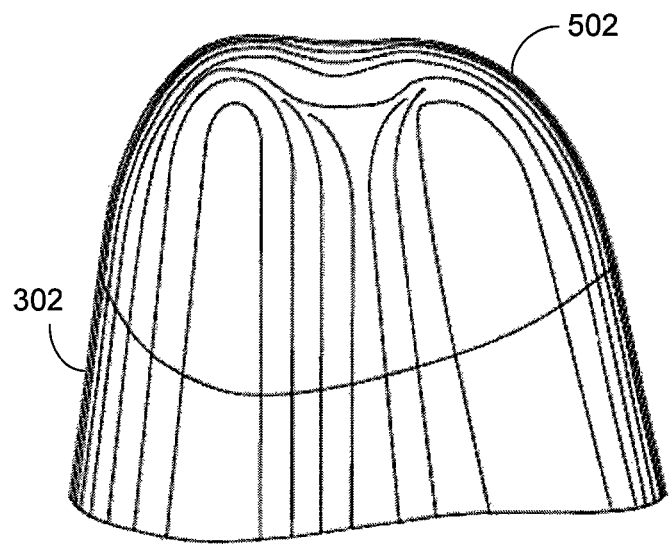
FIG. 5 illustrates the graphics object of FIG. 2 with a surface generated based on input boundaries and uniform scaling with a scale factor of 0.8, according to one embodiment of the invention.

FIGS. 3-5 illustrate scaling with scale factors of 0.3, 0.5 and 0.8 respectively. In each of FIGS. 3-5, the surface 302 is the constraint surface and the surface 304, 402 and 504 are the boundary patches, respectively. For user convenience, the scale factor may be normalized between 0 and 1. The final surface is obtained by mapping back from the modified spherical coordinate system to the Cartesian coordinate system using (9).

Figure 6:
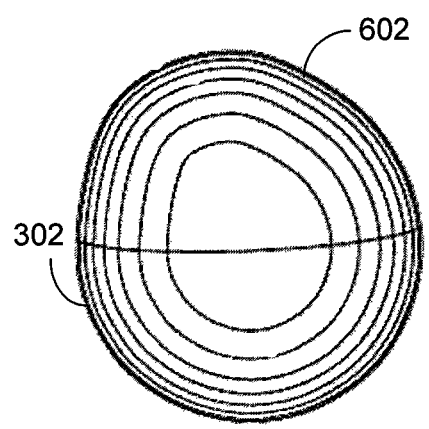
FIG. 6 illustrates the graphics object of FIG. 2 with a surface generated based on input boundaries and non-uniform scaling of boundary patch tangent magnitudes, according to one embodiment of the invention.

In practice, the user may want to use variable scale factors along the boundary to achieve the desired surface shape. This calls for the non-uniform scaling which allows the user to specify some seed scale factors on the boundary. A "scaling" curve along the boundary is then created that interpolates the seed scale factors. Finally, the scaling curve is used to fit a surface that is $f(x,y)$. The fitting is, in fact, the same procedure as described in the section "Surface Representation" where the coordinate z is replaced by the scale factor. FIG. 6 illustrates a non-uniform scaling example.

Figure 7:
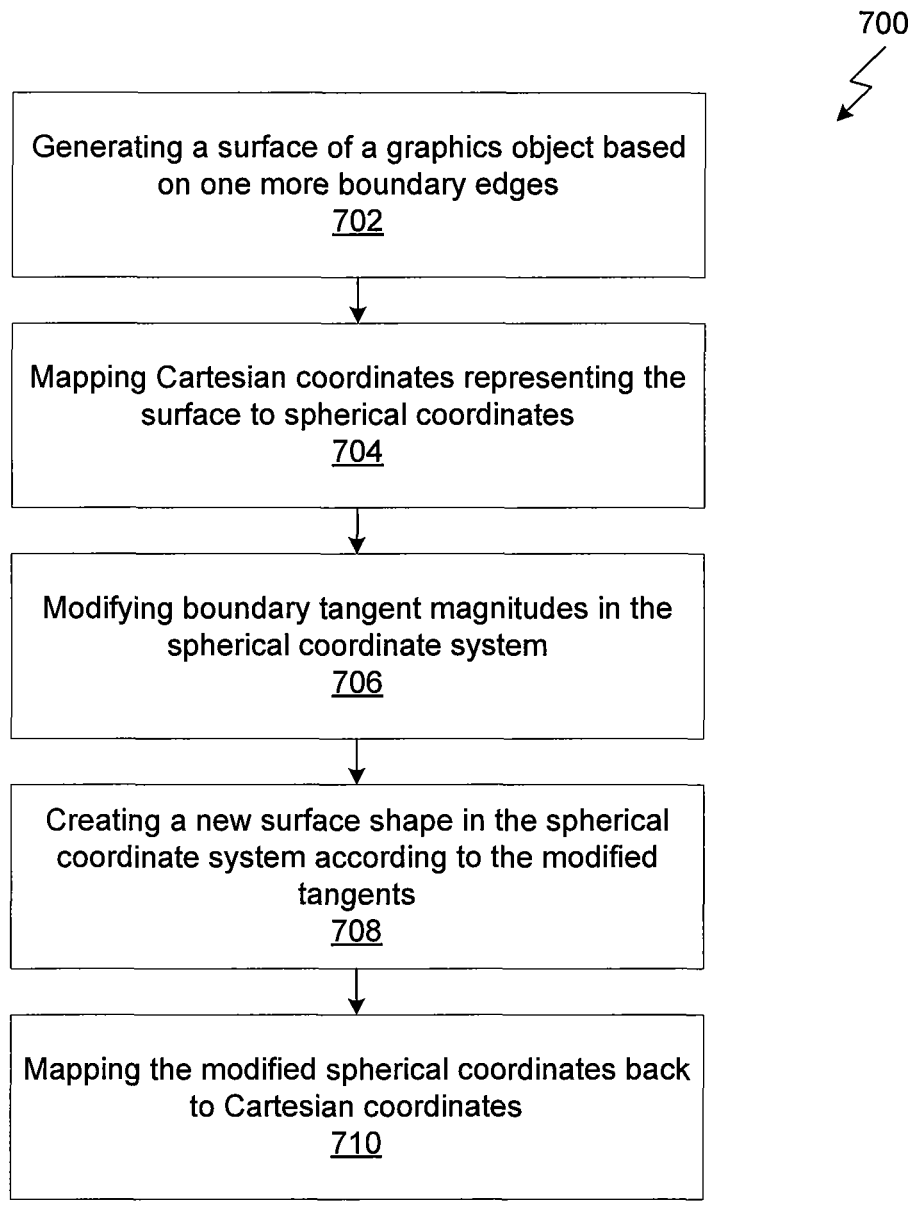
FIG. 7 is a flow diagram of method steps for modifying the shape of a surface of a graphics object, according to one embodiment of the invention.

FIG. 7 is a flow diagram of method steps for modifying the shape of a surface of a graphics object, according to one embodiment of the invention. Although the method steps are described in conjunction with the systems for FIGS. 1-6, persons skilled in the art will understand that any system configured to perform the method steps, in any order, is within the scope of the invention.

The method 700 begins at step 702, where the graphics program 108 generates a surface of the graphics object 202 based on one or more input boundary edges identified by the user of the graphics program 108. The surface is represented in a Cartesian coordinate system and one or more constraints.

At step 704, the graphics program 108 maps the Cartesian coordinates representing the surface to a modified spherical coordinates. The manner in which the Cartesian coordinates are mapped to spherical coordinates is described in great detail above. At step 706, the graphics program 108 modifies the tangent magnitudes along the input boundary in the spherical coordinate system according to one or more constraints specified by the user.

At step 708, the graphics program creates a surface in the spherical coordinate system according to the modified tangents. At step 710, the graphics program maps the modified spherical coordinates back to Cartesian coordinates that represent the new shape of the surface.

In other embodiments, the coordinates can be represented in coordinate systems other than Cartesian and the modified spherical coordinates. The computations involved with such coordinate systems would be well-known in the art.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A computer-implemented method for modifying the shape of a graphics object represented in a computer-aided design (CAD) application, the method comprising:

generating a surface based on one or more boundaries of the graphics object, wherein the surface has a shape defined by a set of first coordinates;

mapping the set of first coordinates to a set of second coordinates that identifies a different tangent for each of the one or more boundary edges, the second set of coordinates being defined relative to a modified spherical coordinate system having a variable origin determined by a variable function that is based on a variable scaling factor for scaling magnitudes of the tangents for the one or more boundary edges;

modifying a first tangent for a first boundary edge by moving the variable origin of the modified spherical coordinate system; and modifying the shape of the surface based on the modified first tangent to generate a modified shape of the surface.

2. The method of claim 1, further comprising the step of mapping the set of second coordinates to a second set of first coordinates to generate the modified surface for the graphics object.

3. The method of claim 1, wherein the step of modifying the shape of the surface comprises computing a new coordinate value for each of the second coordinates based on the modified first tangent.

4. The method of claim 1, wherein the step of modifying the first tangent comprises computing a value for the first tangent based on a tangent modification function and a constraint normal specified by one of the one or more constraint conditions.

5. The method of claim 1, wherein the first tangent is modified based on a scaling factor along each of the one or more boundary edges.

6. The method of claim 1, wherein the first tangent is modified based on a scaling factor along the first boundary edge and a different scaling factor along a second boundary edge.

7. The method of claim 1, wherein one of the one or more constraints specifies a continuity constraint.

8. The method of claim 1, wherein one of the one or more constraints specifies a linear boundary constraint.

9. The method of claim 1, wherein mapping the set of first coordinates to the set of second coordinates comprises calculating a radial coordinate for the modified spherical coordinate system based on a square of a sum of a z-coordinate and a user-modifiable function.

10. The method of claim 9, wherein mapping the set of first coordinates to the set of second coordinates further comprises calculating the radial coordinate as equal to a square root of a sum of an x-coordinate squared, a y-coordinate squared, and the square of the sum of the z-coordinate and the user-modifiable function.

11. The method of claim 10, wherein:
the position-based boundary constraint constrains the surface to interpolate a specified position;
the normal vector-based boundary constraint constrains the surface to assume a specified normal vector; and
the curvature-based boundary constrain constrains the surface to a particular defined curvature.

12. A non-transitory computer-readable storage medium for storing instructions that, when executed by a processor, cause the processor to modify the shape of a graphics object represented in a computer-aided design (CAD) application, by performing the steps of:
generating a surface based on one or more boundaries of the graphics object, wherein the surface has a shape defined by a set of first coordinates;
mapping the set of first coordinates to a set of second coordinates that identifies a different tangent for each of the one or more boundary edges, the second set of coordinates being defined relative to a modified spherical coordinate system having a variable origin determined by a variable function that is based on a variable scaling factor for scaling magnitudes of the tangents for the one or more boundary edges;
modifying a first tangent for a first boundary edge by moving the variable origin of the modified spherical coordinate system; and
modifying the shape of the surface based on the modified first tangent to generate a modified shape of the surface.

13. The non-transitory computer-readable storage medium of claim 12, further comprising the step of mapping the set of second coordinates to a second set of first coordinates to generate the modified surface for the graphics object.

14. The non-transitory computer-readable storage medium of claim 12, wherein the step of modifying the shape of the surface comprises computing a new coordinate value for each of the second coordinates based on the modified first tangent.

15. The non-transitory computer-readable storage medium of claim 12, wherein the step of modifying the first tangent comprises computing a value for the first tangent based on a tangent modification function and a constraint normal specified by one of the one or more constraint conditions.

16. The non-transitory computer-readable storage medium of claim 12, wherein the first tangent is modified based on a scaling factor along each of the one or more boundary edges.

17. The non-transitory computer-readable storage medium of claim 12, wherein the first tangent is modified based on a scaling factor along the first boundary edge and a different scaling factor along a second boundary edge.

18. The non-transitory computer-readable storage medium of claim 12, wherein one of the one or more constraints specifies a continuity constraint.

19. The non-transitory computer-readable storage medium of claim 12, wherein one of the one or more constraints specifies a linear boundary constraint.

20. A computer system, comprising:
a memory; and
a processor configured to:
generate a surface based on one or more boundaries of the graphics object, wherein the surface has a shape defined by a set of first coordinates,
map the set of first coordinates to a set of second coordinates that identifies a different tangent for each of the one or more boundary edges, the second set of coordinates being defined relative to a modified spherical coordinate system having a variable origin determined by a variable function that is based on a variable scaling factor for scaling magnitudes of the tangents for the one or more boundary edges,
modify a first tangent for a first boundary edge by moving the variable origin of the modified spherical coordinate system, and
modify the shape of the surface based on the modified first tangent to generate a modified shape of the surface.

21. The computer system of claim 20, wherein the memory is configured to store instructions that cause the processor to generate the surface, map the set of first coordinates to the set of second coordinates, modify the first tangent for a first boundary edge, and modify the shape of the surface.

* * * * *